Sept. 21, 1926.
F. A. BENFORD
REFLECTOMETER
Filed Sept. 7, 1923
1,600,865
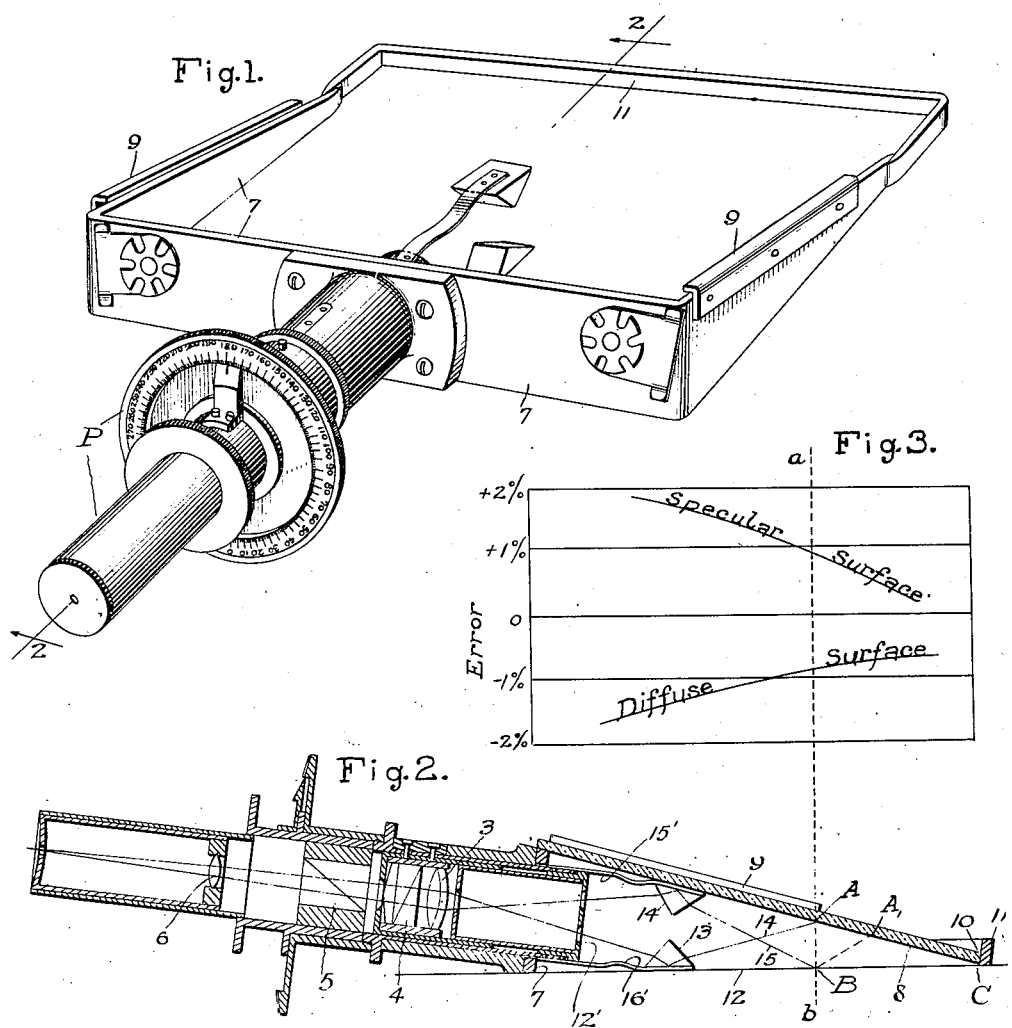
Inventor:
Frank A. Benford,
by *Alexander F. Lunt*
His Attorney.

Patented Sept. 21, 1926.

1,600,865

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

REFLECTOMETER.

Application filed September 7, 1923. Serial No. 661,499.

My invention relates to reflectometers, that is, devices for measuring the amount of light reflected by a surface. One form of device for this purpose which is on the market employs two parallel surfaces between which an area is bounded by a specular ring. In this device, one of the surfaces on one side of the ring serves as the illuminating surface and the surface on the opposite side of the ring, as the illuminated surface. Through the medium of a photometer, a region of the illuminating surface is compared with a region of the illuminated surface. Devices of the above character are usually portable. The type of device of the prior art has the objection that it is not accurate by approximately ten per cent. The causes of the inaccuracy are, for example, the use of a specular surface as the bounding surface between the two planes; also the large extent of the bounding surface; also, the angle of observation is not the best angle for obtaining an average reading.

Among the objects of my invention are to provide a reflectometer which is free from the above objections and one which is accurate to a much greater extent and to eliminate as much as possible the bounding surfaces between the planes. This is done by causing the surfaces to slope with respect to each other and by reducing the sloping angle as much as possible while preserving the proper angle of observation between the photometer and the surfaces and by using in this connection reflecting prisms between the reflectometer and the surfaces.

Another object is to provide other details of improvement for increasing the efficiency and serviceability of a device of the above character. The means for accomplishing the above and other useful ends are hereinafter more fully set forth and claimed, reference being had to the accompanying sheet of drawings, Fig. 1 of which shows in perspective, the photometer attached to the bounding surface or frame located between the two surfaces and which is substituted for the specular ring of the old type of device. In this figure, the reflecting prisms within the frame are also shown. In Fig. 2 there is shown a vertical section of the complete device taken on line 2—2, Fig. 1. In Fig. 3 are shown curves representing readings obtained in connection with the diffusing surface and the specular surface when the field of observation is moved toward or away from the apex of the dihedral angle formed by the two planes. In the portable reflectometer of the art the centers of the fields of observation have always been so located with respect to the limiting bounds between the two surfaces that the readings of both specular and diffusing surfaces, such as glass and magnesium carbonate respectively, have been low. With the device of my construction, the nearer the field of observation is selected to the apex of the dihedral angle between the planes, in determining the reflection of the diffusing surface, the higher the reading. The reverse is the case when a specular surface is used. At points very near the apex of the angle, the readings for a specular surface are too low and as the region is selected further away from the angle, the curve rises so that a point is reached beyond which the readings are too high. I therefore selected the points A and B which represent the centers respectively of the fields of observation on the illuminating surface and on the illuminated surface at a distance from the apex C of the dihedral angle where the photometric error for the specular surface is about 1 per cent high and for the magnesium carbonate, about 1 per cent low.

Referring more in detail to the drawings, the photometer P is of the standard type and is provided with an objective lens 3, polarizer 4, analyzer 5, and eye-piece 6. This photometer is secured to the frame 7, Fig. 1, in any suitable manner, the forward end of which photometer projects through the side piece 7' of the frame. The frame is adapted to receive on top thereof the translucent plate 8. For this purpose guides 9 are provided which guides are secured to the sides of the frame. When in position, the forward edge 10 of the plate rests against the inner surface of the side 11 of the frame. This translucent plate 8 constitutes the illuminating plane. The device as thus constructed may be set upon any surface 12, Fig. 2, the reflecting qualities of which surface may be determined by comparison with the illuminating surface 8. With the construction shown, the photometer receives the light from the upper plate 8 from a region about the point A. The light from this point reaches a prismatic reflector 13 along the line 14' which reflector directs the light throughout the lens 3 of the photometer and finally reaches the eyepiece 6. Similarly, the photometer receives light from the lower surface 12 from the region about the point B, both of which points are in the same plane. The light from the point B reaches a second prismatic reflector 14 along the line 15, which reflector directs the light to the lens 3 through which the light finally reaches the eyepiece 6. Both of the prismatic reflectors 13 and 14 are suitably mounted on springs 15' and 16' which springs are secured to the forward end of the photometer. I have found that in order to obtain a correct reading, the angle between the lines 14' and 15 and the surfaces 8 and 12 respectively should be of a particular magnitude, that is, 25 degrees more or less. In order to obtain this angle without the use of the prismatic reflectors 13 and 14, it will be necessary to increase the angle between the surfaces 8 and 12 which would increase the area of the frame 7. This is undesirable inasmuch as the effect of increasing this surface is to decrease the efficiency of the device in the matter of correct readings. In this connection, it should be pointed out that by cutting down the frame 11 so as to cause the sides to slope as shown in the drawings, the area of the frame is so reduced that the error in the readings is decreased to 5 per cent. Furthermore, I find that by moving the points A and B toward the apex C of the angle between the plates, I can reduce the error considerably to a value in the neighborhood of 2½ per cent. Furthermore, by making the inner surface of the frame of a white diffusing character, as for example, by the use of white enamel, the error in the readings may be still further reduced so that the readings of the instrument may be in the neighborhood of ½ of 1 per cent of being exact. Passing now to a technical consideration of the invention, it can be readily demonstrated that if a plane surface, such as surface 12, is illuminated by a parallel surface of infinite extent, the illumination of the plane surface will be equal in brightness to that of the illuminating surface. However, a plane of infinite extent is not to be attained in practice and it is therefore necessary to resort to some practical device which will approximate the same result. Overlooking for the moment the importance of obtaining ideal conditions, it will be assumed that the transparent porcelain plate which may be used as the upper surface of the dihedral angle shown in Fig. 2, is the illuminator or source of light for the surface 12 upon which the instrument rests and which is to be tested for its coefficient of reflection. When these two surfaces 8 and 12 are observed through the optical train that forms a photometric field illuminated by polarized light, the upper half of the field is found to derive its light from the point A on the end surface of the illuminator and the lower half of the field is illuminated from the point B on the test surface 12. By rotating the Nicol prism 5 contained in the rear of the optical tube, the intensity of one field may be raised while the other is lowered and the photometric balance may always be obtained, as is well known in the art, this construction being common in photometers. If the test surface 12 is a perfect reflector, then the brightness about the point B will be equal to the brightness about the point A and the pointer of the photometer, which indicates the position of the Nicol prism, will be at 45 degrees, or at the corresponding position 135 degrees, 225 degrees and 315 degrees in the other quadrants. If the test surface falls short of being perfect—and it always does—the balancing point will fall short of 45 degrees, or exceeds it, depending upon which component of the polarized light is being measured. The scale of rotation is marked in degrees and for one component of a polarized light with the scale in the position shown in Fig. 1, the relative brightness of B to A is $\frac{B}{A} = \tan^2 a$ where $a$ is the departure of the pointer of the vertical axis of the scale and where the entire optical train, except the prisms within the dihedral space is turned through 90 degrees of the other polarizer component is $$\frac{B'}{A'} = \cot^2 a'$$

where $a$ is now greater than 45 degrees. The coefficient K of the surface 12 is $K = \frac{1}{2}$ (tan $a$ + cot $a'$).

The illuminator, not being perfect, certain sources of error must be considered. It is supposed that only the point B on the test surface is being considered. In the instrument, as constructed, the direct illumination for the sloping illuminator 8 is some 96 per cent of an infinite parallel illuminator and by coating the surrounding walls of the frame 9 with a good white enamel, it has been found possible to bring the illuminator up to 99.6 per cent of the theoretical magnesium, whereas, the reflectometer of the prior art previously mentioned can reach only 90 per cent of the magnesium and its readings are at best some 10 per cent low. Thus, magnesium carbonate, whose coefficient has been determined by a number of experimenters to have a coefficient of 0.98, has, according to the instrument of the prior art mentioned, a coefficient of .98, and as determined by the instrument of my invention, has a coefficient of 0.974. This test surface is a very good diffuser, that is, under a beam of light the surface brightness is almost equal from any angle of view. When testing specular surfaces such as a mirror, there is another factor entering the action of the instrument and it will be shown how this factor can be used to counterbalance certain other factors and thus provide and thus arrive at a high degree of accuracy.

It has been found experimentally that often when the illuminator derives its light from a distant source and is originally of the most uniform brightness, the edge of the illuminator near the point of the edge is slightly brighter than this part near the back wall through which the optical train enters. As a result, the point $A_1$ is slightly brighter than the point A and since the image of $A_1$ is observed in the mirror, there is a decided tendency for the instrument to give readings above the true value. We thus have an instrument that for diffusing surfaces reads low by less than 1 per cent and it has been found experimentally that the readings of a specular surface are less than 1 per cent high. The great majority of surfaces reflect light by a mixture of diffused and specular action and in this most common of all cases, the positive error of the specular component largely overcomes the negative error of the diffused components and in any event, the error can be said to lie within the limits of ±1 per cent.

It is probably true that the coefficient of reflection of every surface is different for each angle of observation, thus, magnesium carbonate under diffused illumination, such as oxides under the illuminator of my invention, will be slightly brighter when viewed along a line nearly grazing the surface than if viewed along a line normal to the surface. A sheet of ordinary glass under the same conditions would have a coefficient of brightness of nearly 1 at gazing or 0.08 when viewed from a line normal to its surface. We are here confronted with the fact that the apparent coefficient of reflection of the surface depends upon the angle of view and it is therefore desirable to be able to arrange the angle of view so as to obtain the particular angle that will give a fair average for all angles. In Fig. 2, the prisms within the dihedral angle may be rotated in a vertical plane and thus change both the angle of incidence and also the distance of the points A and B from the dihedral angle. This adjustment, in addition to a forward and backward adjustment of the entire optical train including the reflecting prisms 13 and 14, makes it possible to select a pair of points A and B such that the positive and the negative errors will tend to cancel one another.

In order to more clearly illustrate what has just been said, the curves in Fig. 3 have been prepared and have been drawn with respect to Fig. 2, the abscissæ indicating the distance from the apex C of the angle between the planes 8 and 12 to points on the test surface 12, such as point B. It will be seen therefore that the curve of the diffusing surface approaches and in fact reaches the magnesium, as the point B is shifted toward the right. On the other hand, the specular surface, as indicated by the curve rises further and further as the point B recedes from the point C and crosses the zero line before the point B reaches the point C. For this reason, the points A and B have been located in proximity to the line $a\ b$, Fig. 3, which shows the specular curve and the diffusing curve at about equal distances from the zero line.

What I claim as new and desire to secure by Letters Patent of the United States is:—

1. In a device for measuring the coefficient of reflection of a surface, a photometer, a diffusing screen and a frame for bringing the photometer, an area of the screen and an area of the surface to be tested into such relation that said areas fall within the field of the photometer for comparison and a reflecting element interposed between each of said areas and the photometer, along the path of the rays from each of said surfaces for directing said rays to the photometer and for increasing the angle of vision.

2. In a device for measuring the coefficient of reflection of a surface, a photometer, a diffusing screen and a frame for bringing the photometer, an area of the screen and an area of the surface to be tested into such relation that said areas fall within the field of the photometer for comparison and a refracting element interposed between each of said areas and the photometer and along the path of the rays from each of said surfaces for directing the rays to the photometer and for increasing the angle of vision.

3. In a device for measuring the coefficient of reflection of a surface, a photometer, a diffusing screen and a frame for bringing the photometer, an area of the screen and an area of the surface to be tested into such relation that said areas fall within the field of the photometer for the purpose of comparison. and means for causing the rays from said areas to cross twice in their path between the area and the eye-piece of the photometer.

4. In a device for measuring the coefficient of reflection of a surface, a photometer, a diffusing screen and a frame for bringing the photometer, an area of the screen and an area of the surface to be tested into such relation that said areas fall within the field of the photometer for the purpose of comparison, and means for causing the rays from said areas to cross between said areas and the eye-piece of the photometer.

5. In a device for measuring the coefficient of reflection of a surface, a photometer, a diffusing screen and a frame for bringing the photometer, an area of the screen and an area of the surface to be tested into such relation that they form a dihedral angle together with an enclosing and subtending bounding surface, a photometer projected into said angle and so related to the two surfaces that the area in each surface falls within the field of the photometer.

6. In a device for measuring the coefficient of reflection of a surface, a photometer, a diffusing screen and a frame for bringing the photometer, an area of the screen and an area of the surface to be tested into such relation that they form a dihedral angle together with an enclosing and subtending bounding surface, a photometer projected into said angle and so related to the two surfaces that the area in each surface falls within the field of the photometer, the center of either of said areas being located nearer to the apex of the angle than to the bounding surface along a plane perpendicular to the illuminated surface and which also passes through the optical axis of the photometer.

7. In a device for measuring the coefficient of reflection of a surface, a photometer, a diffusing screen and a frame for bringing the photometer, an area of the screen and an area of the surface to be tested into such relation that they form a dihedral angle together with an enclosing and subtending bounding surface, a photometer projected into said angle and so related to the two surfaces that the area in each surface falls within the field of the photometer, the center of either of said areas being so located with respect to the apex of the dihedral angle that the reading for a specular surface is as much above the average for all readings from all angles with respect to said specular surface as the reading for a diffusing surface is below the average for all readings from all angles with respect to the diffusing surface.

8. In a device for measuring the coefficient of reflection of a surface, a photometer, a diffusing screen and a frame for bringing the photometer, an area of the screen and an area of the surface to be tested into such relation that they form a dihedral angle together with an enclosing and subtending bounding surface, a photometer projected into said angle and so related to the two surfaces that the area in each surface falls within the field of the photometer, the center of either of said areas so located with respect to the apex of the dihedral angle that the reading for a specular surface is within one percent above the average for all readings from all of the angles with respect to said specular surface and the reading for a diffusing surface is within one percent below the average for all readings from all of the angles with respect to the diffusing surface.

9. A device for measuring the coefficient of reflection of a surface, having a photometer, a diffusing screen and a frame for bringing the photometer, the screen and the surface to be tested into such relation that the screen and the surface slope toward each other and toward the axis of the photometer to increase the angle of observation through the photometer and to increase the dihedral angle of illumination of the surface.

10. A device for measuring the coefficient of reflection of a surface, having a photometer, a diffusing screen and a frame for bringing the photometer, the screen and the surface to be tested into such relation that the screen and the surface slope toward each other and toward the axis of the photometer to increase the angle of observation through the photometer and to increase the dihedral angle of illumination of the surface, said photometer and screen being secured to said frame, the photometer being so located that its axis projects into the dihedral angle formed between the screen and the surface to be tested and between the screen on one side and the surface on the other.

11. A device for measuring the coefficient of reflection of a surface, having a photometer, a diffusing screen and a frame for bringing the photometer, the screen and the surface to be tested into such relation that an area of the screen and an area of the surface fall within the field of the photometer for comparison while sloping toward each other, whereby the angle of observation between the photometer on the one hand and the areas under observation on the other, is increased.

12. A device for measuring the coefficient of reflection of a surface, having a photometer, a diffusing screen and a frame for bringing the photometer, the screen and the surface to be tested into such relation that an area of the screen and an area of the surface fall within the field of the photometer for comparison while sloping toward each other, whereby the angle of observation between the photometer on the one hand and the areas under observation on the other, is increased, one of said areas falling on one side of the axis of the photometer and the other area on the opposite side of said axis.

13. A device for measuring the coefficient of reflection of a surface, having a photometer, a diffusing screen and a frame for bringing the photometer, the screen and the surface to be tested into such relation that an area of the screen and an area of the surface fall within the field of the photometer for comparison while sloping toward each other, whereby a dihedral angle is formed between the two areas, the axis of the photometer so projecting into said angle that a plane through the axis of the photometer passes through the vertex of the dihedral angle.

14. A device for measuring the coefficient of reflection of a surface, said device having a photometer, a diffusing screen for comparison and a frame for bringing the screen, the surface to be tested, and the photometer into such relation that an area of the screen and an area of the surface are brought within the field of the photometer, said frame constructed to maintain the screen and the surface in inclined relation to each other, thereby forming a dihedral angle between them, with the base toward the photometer, the photometer and the frame being so related that the said area of the surface which is brought within the field of the photometer is located at the position where the photometric error for a diffusing surface and the photometric error for a specular surface are approximately the same and of opposite signs.

15. A device for measuring the coefficient of reflection of a surface, said device having a photometer, a diffusing screen for comparison and a frame for bringing the screen, the surface to be tested and the photometer into such relation that an area of the screen and an area of the surface are brought within the field of the photometer, said frame constructed to maintain the screen and the surface in an inclined relation to each other, thereby forming a dihedral angle between them, one side of the frame forming the base of the dihedral angle, the photometer and the frame being so related that the center of the area of the surface is located between the mid point of the altitude of the angle and the apex of the angle.

16. The process of measuring the coefficient of reflection of a surface which consists in bringing an area of a diffusing screen and an area of the surface to be measured within the field of a photometer, while the screen and the surface are inclined toward each other and taking a photometric reading.

17. The process of measuring the coefficient of reflection of a surface which consists in bringing an area of a diffusing screen and an area of the surface to be measured within the field of the photometer, while the screen and the surface are inclined toward each other and toward the axis of the photometer and taking a photometric reading.

18. A device for measuring the coefficient of reflection of a surface, said device having in combination a photometer and a frame arranged to receive an illuminated surface and a surface to be tested, said frame placed in such relation to said photometer that the illuminated surface and the surface to be measured are both thrown into the field of the photometer for comparison when placed in said frame, and means interposed between the photometer and the surfaces to increase the angle of observation through the photometer.

19. A device for measuring the coefficient of reflection of a surface, said device having in combination a photometer and a frame arranged to receive an illuminated surface and a surface to be tested, said frame being placed in such relation to said photometer that the illuminated surface and the surface to be measured are both thrown into the field of the photometer for comparison when placed in said frame, said frame arranged to maintain said surfaces sloping toward each other and toward the axis of the photometer to increase the angle of observation through the photometer.

In witness whereof, I hereunto set my hand this 6th day of September, 1923.

FRANK A. BENFORD.